UNITED STATES PATENT OFFICE.

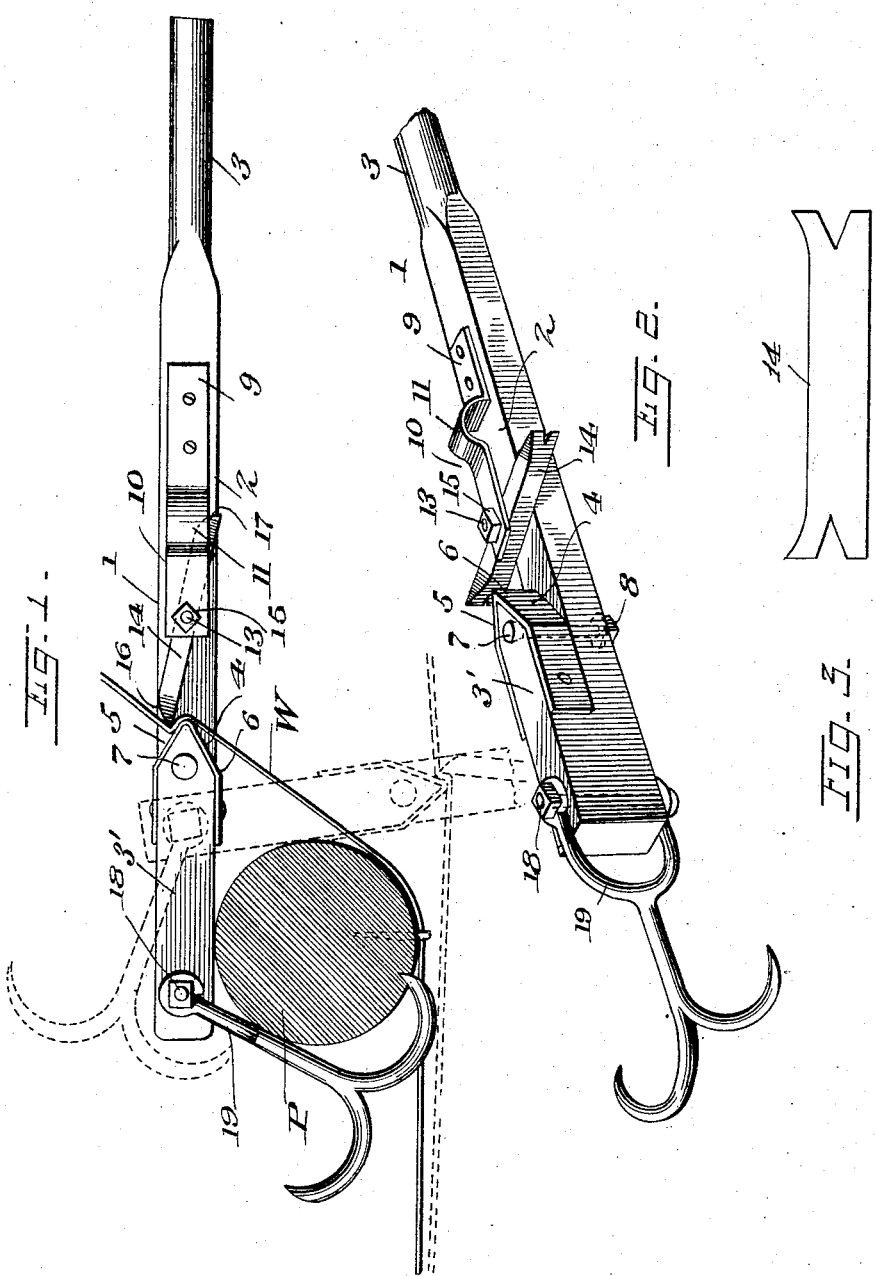

HOWARD R. AYER, OF UNDERHILL, VERMONT.

WIRE-STRETCHER.

1,186,368.   Specification of Letters Patent.   Patented June 6, 1916.

Application filed December 8, 1915. Serial No. 65,828.

*To all whom it may concern:*

Be it known that I, HOWARD R. AYER, a citizen of the United States, residing at Underhill, in the county of Chittenden and State of Vermont, have invented new and useful Improvements in Wire-Stretchers, of which the following is a specification.

The present invention relates to improvements in devices for stretching wire, either for erecting a wire fence or for repairing the runners of the fence.

The primary object of the invention is to construct a device of this class whereby a wire runner may be grasped and stretched to the desired degree by one hand of an operator and held in such stretched to taut condition to permit of the operator securing the wire to the post, whereby only a single operator may be employed for both stretching and securing the wire.

Another object of the invention is the construction of a device of this class which may be operated to stretch a wire in either direction without necessitating the rearrangement of the parts, as well as to provide the said structure with a hook having a pair of oppositely disposed bills either of which may be drawn to engage with the post to sustain the stretcher while the wire is being attached to the post.

With the above recited objects in view, the improvement resides in the construction, combination and arrangement of parts set forth in the following specification and falling within the scope of the appended claims.

In the drawings: Figure 1 is a view illustrating the application of the improvement, and Fig. 2 is a perspective view of the improvement. Fig. 3 is a front elevation of the dog.

Referring now to the drawing in detail, the numeral 1 designates my improved stretcher in its entirety.

The stretcher 1 includes a substantially rectangular member or shank 2 having one of its ends rounded to provide a handle 3 and its opposite end widened, as at 3′, to provide what I shall term a head. The head 3′ has its inner end beveled in opposite directions from its center to provide a jaw having opposite faces 4 and 5 respectively which have a metal reinforcement 6, and in order to further reinforce the jaw portion of the head 3′ I insert a bolt 7 centrally of the jaw, the same having its head received within the countersink in the said jaw and its portion, which extends below the lower edge of the device being provided with a securing nut 8. Secured upon the shank 2 upon the face thereof provided with the head 3′, and adjacent the juncture with the handle 3 is the longitudinal foot portion 9 of an angular bracket 10. The angular portion is preferably rounded outwardly, as at 11, and the end of the longitudinal member of the bracket is provided with an opening which registers with an opening in the shank 2, a bolt 13 passing through the registering openings as well as through a central opening formed in a dog 14, a nut 15 securing the bolt upon the bracket. The dog 14 is rectangular in cross section, and has its ends arranged an equal distance from its pivot, and one side of the dog is beveled or inclined toward the said ends, as indicated by the numerals 16 and 17. The opposite ends of the dog are thus provided with sharpened working edges, and the outer portions of the edges of the dog are preferably rounded upwardly from what may be termed the top of the dog proper, providing the working faces or edges of the same of a greater width than at any other portion of the dog, and the said sharpened edges are preferably each centrally provided with a longitudinally extending depression extending from the beveled ends of the said jaws. The dog may be swung to bring one of its ends to engage with the face 4 of the jaw or its other end against the other face 5 of the said jaw, in accordance with the direction which the wire W is to be stretched, and in operating the device the wire is brought against one of the faces of the jaw, the dog swung so that one of its sharpened edges will contact with the said wire and held in such contact by the fore-finger of the operator, the remainder of the operator's hand grasping the handle, while the end of the shank provided with the head 3 is arranged against a post P, the operator swinging the device around the said post until the wire is drawn fully taut.

The numeral 18 designates a bolt which passes through the end of the device provided with the head 3, and which is adapted to serve as a pivot for the oppositely disposed arms formed upon the U-shaped end of a hook 19. This hook is provided with two oppositely disposed bills which are arranged at an angle with respect to the pivoted arms of the hook and one of the said bills may be arranged upon the post P and the structure rotated upon the pivotal connection of the hook with the members if desired. In either event, after the wire has been drawn sufficiently taut one of the bills of the hook is forced into biting engagement with the post and the structure proper sustained thereby, so that the operator may release the structure and secure the strand of wire W to the post P.

In tightening the runners or strands of an erected fence it is merely necessary that the staples of, say, about every fifth post be loosened or removed, and the device is applied to the wire runner as previously described and operated as set forth, when a slack wire will be readily tightened after which the fasteners are replaced.

From the above description, the simplicity of the device, as well as the advantages of the improvement will, it is thought, be perfectly apparent to those skilled in the art to which such invention appertains without further detailed description.

Having thus described the invention, what I claim is:

1. A wire stretcher provided with a rectangular member including a shank, a handle and a head, the said head having a V-shaped end arranged over the shank and providing jaws and a dog having its opposite ends beveled on the same side of the dog to provide two sharpened edges, the said dog being centrally pivoted to the shank whereby one of its edges may be swung against one of the jaws.

2. A wire stretcher comprising a rectangular member including a shank, a handle formed upon one end of the shank, the opposite end of the shank having a projection forming a head, the head having an angular face arranged over the shank to provide a jaw, a pivoted dog secured to the shank and adapted to be swung to engage with the jaw, and a hook having a U-shaped end pivotally connected with the head, said hook having oppositely disposed bills which are arranged at an angle to the pivoted arms.

3. A wire stretcher including a head having a V-shaped inner end providing the same with jaws, a reinforcing plate upon the jaws, a bracket upon the stretcher, an elongated rectangular dog centrally pivoted to the bracket, said dog having one of its faces beveled toward its ends to provide the said ends with sharpened edges, the outer face of the dog at the ends being widened, the said ends being provided with transverse depressions, and one of the said ends adapted to be swung into contact with one of the jaws, and a hook pivotally secured to the end of the stretcher.

In testimony whereof I affix my signature in presence of two witnesses.

HOWARD R. AYER.

Witnesses:
W. SCOTT NAY,
C. E. AYER.

Copies of this patent may be obtained for five cents each, by addressing the "Commissioner of Patents Washington, D. C."